United States Patent
Huang

(10) Patent No.: US 11,655,961 B2
(45) Date of Patent: May 23, 2023

(54) REFLECTOR AND BACKLIGHT HAVING THE SAME

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventor: Guibin Huang, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 0 days.

(21) Appl. No.: 17/944,979

(22) Filed: Sep. 14, 2022

(65) Prior Publication Data
US 2023/0013359 A1    Jan. 19, 2023

Related U.S. Application Data

(63) Continuation of application No. PCT/CN2020/139931, filed on Dec. 28, 2020.

(30) Foreign Application Priority Data

Oct. 16, 2020 (CN) .......................... 202022322229.0

(51) Int. Cl.
*F21V 7/00* (2006.01)
*F21V 19/00* (2006.01)
*F21Y 115/10* (2016.01)

(52) U.S. Cl.
CPC ............ *F21V 7/005* (2013.01); *F21V 19/003* (2013.01); *F21Y 2115/10* (2016.08)

(58) Field of Classification Search
CPC ..... F21V 7/005; F21V 19/003; F21Y 2115/10
See application file for complete search history.

(56) References Cited

U.S. PATENT DOCUMENTS

2007/0164875 A1\* 7/2007 Fredericks .............. F21V 29/74
340/815.45
2007/0274100 A1\* 11/2007 Yang .................... G02B 6/0018
362/615
(Continued)

FOREIGN PATENT DOCUMENTS

CN          204127877 U      1/2015
CN          210219385 U      3/2020
(Continued)

OTHER PUBLICATIONS

International Search Report issued in International application No. PCT/CN2020/139931, dated Jun. 23, 2021.

*Primary Examiner* — Evan P Dzierzynski
(74) *Attorney, Agent, or Firm* — Bayes PLLC

(57) ABSTRACT

A reflector and a backlight having the same are provided. The reflector is provided with a special-shaped assembly hole. The special-shaped assembly hole includes a first included angle and a second included angle opposite to each other. Two sides forming the first included angle are respectively a first upper side and a second upper side, and two sides forming the second included angle are respectively a first lower side and a second lower side. The special-shaped assembly hole further includes a first arc-shaped side and a second arc-shaped side opposite to each other. The special-
(Continued)

shaped assembly hole further includes a first limiting side, a second limiting side, a third limiting side, and a fourth limiting side.

13 Claims, 6 Drawing Sheets

(56) References Cited

U.S. PATENT DOCUMENTS

| | | | | |
|---|---|---|---|---|
| 2013/0135875 A1* | 5/2013 | Schutte | ...................... | F21V 7/10 |
| | | | | 362/346 |
| 2014/0009942 A1* | 1/2014 | Kramer | ...................... | F21V 7/10 |
| | | | | 362/296.07 |
| 2016/0327243 A1* | 11/2016 | Appelhans | ................ | F21V 7/09 |
| 2017/0271560 A1* | 9/2017 | Gong | .................... | H01L 33/486 |

FOREIGN PATENT DOCUMENTS

| | | |
|---|---|---|
| JP | 2005353498 A | 12/2005 |
| JP | 2017027789 A | 2/2017 |

* cited by examiner

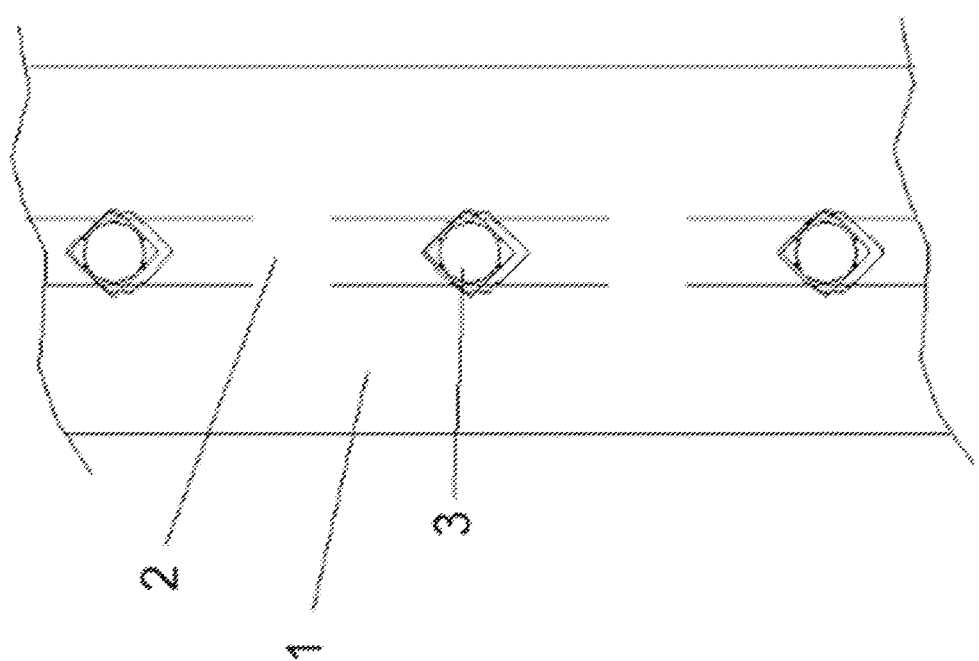

REFLECTOR AND BACKLIGHT HAVING THE SAME

CROSS-REFERENCE TO RELATED APPLICATION

The present application is a continuation of International Application No. PCT/CN2020/139931, filed on Dec. 28, 2020, and claims the benefit of priority to China Patent Application No. CN202022322229.0, filed on Oct. 16, 2020, the contents of which are incorporated herein by reference in their entireties.

TECHNICAL FIELD

The present disclosure relates to the technical field of backlights, and in particular to a reflector and a backlight having the same.

BACKGROUND

A backlight is generally composed of multiple light bars and multiple corresponding reflectors. The light bar is composed of a PCB board, a lamp bead, and a lens. The lens is in a shape of a container, which is inverted on the PCB board and covers the lamp bead on the PCB board. The lens is provided with a weld leg of the lens at the bottom portion, which is fixed on the PCB board with curing adhesive, so as to complete connection between the lens and the PCB board. The PCB board and the reflector are laminated, and the reflector is provided with a special-shaped assembly hole for accommodating the lamp bead and the lens. Due to an influence of installation accuracy, the PCB board and the reflector are prone to misalignment, resulting in the weld leg of the lens and a side edge of the special-shaped assembly hole being too close.

At present, there is such a problem that the reflector will focus light emitted by the lamp bead and will emit a lot of heat. In addition, the reflector is close to the PCB board, since the PCB board generates heat during operation, the reflector will be also heated up accordingly. After being heated up, the reflector will expand to a certain extent, and will stretch when expanding. When the PCB board and the reflector are misaligned, the reflector will cut the weld leg of the lens, which will lead to unstable connection between the lens and the PCB board and may even cause the lens to fall off from the PCB board, thus affecting the lighting effect of the backlight.

SUMMARY

At least a part of embodiments of the present disclosure provides a reflector and a backlight having the same, so as to at least solve a technical problem that special-shaped assembly holes of conventional reflectors have poor fault tolerance and a lens is prone to fall off from a PCB board.

According to one aspect of one of embodiments of the present disclosure, a reflector is provided. The reflector is provided with a special-shaped assembly hole, and the special-shaped assembly hole penetrates the reflector. The special-shaped assembly hole is of an axisymmetric shape. The special-shaped assembly hole is symmetrical along a horizontal axis passing through a center. The special-shaped assembly hole is symmetrical along a vertical axis passing through the center. The center is a center of the special-shaped assembly hole, and the horizontal axis and the vertical axis are perpendicular to each other in a plane where the reflector is located. The special-shaped assembly hole is in a shape of an irregular rhombus. The special-shaped assembly hole includes a first included angle and a second included angle opposite to each other. A vertex of the first included angle and a vertex of the second included angle are on the vertical axis. Two sides forming the first included angle are respectively a first upper side and a second upper side, and two sides forming the second included angle are respectively a first lower side and a second lower side. The special-shaped assembly hole further includes a first arc-shaped side and a second arc-shaped side opposite to each other. The first arc-shaped side and the second arc-shaped side are symmetrical along the horizontal axis passing through the center, and are symmetrical along the vertical axis passing through the center. The first arc-shaped side and the second arc-shaped side protrude toward the center. The special-shaped assembly hole further includes a first limiting side, a second limiting side, a first connection side, and a second connection side. The first limiting side is connected to an end of the first arc-shaped side close to the first included angle, and the first limiting side is connected to the first upper side through the first connection side. The second limiting side is connected to an end of the first arc-shaped side close to the second included angle, and the second limiting side is connected to the first lower side through the second connection side. The first limiting side is parallel to the first upper side, and a vertical distance from the first limiting side to the center is less than that from the first upper side to the center. The second limiting side is parallel to the first lower side, and a vertical distance from the second limiting side to the center is less than that from the first lower side to the center. The special-shaped assembly hole further includes a third limiting side, a fourth limiting side, a third connection side, and a fourth connection side. The third limiting side is connected to an end of the second arc-shaped side close to the first included angle, and the third limiting side is connected to the second upper side through the third connection side. The fourth limiting side is connected to an end of the second arc-shaped side close to the second included angle, and the fourth limiting side is connected to the second lower side through the fourth connection side. The third limiting side is parallel to the second upper side, and a vertical distance from the third limiting side to the center is less than that from the second upper side to the center. The fourth limiting side is parallel to the second lower side, and a vertical distance from the fourth limiting side to the center is less than that from the second lower side to the center.

Optionally, a gap between the first limiting side and the first upper side is greater than or equal to 2 mm. A gap between the second limiting side and the first lower side is greater than or equal to 2 mm. A gap between the third limiting side and the second upper side is greater than or equal to 2 mm. A gap between the fourth limiting side and the second lower side is greater than or equal to 2 mm.

Optionally, a length of the first limiting side is less than or equal to that of the first upper side. A length of the second limiting side is less than or equal to that of the first lower side. A length of the third limiting side is less than or equal to that of the second upper side. A length of the fourth limiting side is less than or equal to that of the second lower side.

Optionally, a length of the first limiting side is ½ of a length of the first upper side. A length of the second limiting side is ½ of a length of the first lower side. A length of the third limiting side is ½ of a length of the second upper side. A length of the fourth limiting side is ½ of a length of the second lower side.

According to another aspect of one of embodiments of the present disclosure, a backlight is provided, comprising a light bar and the above-mentioned reflector. The light bar includes a PCB board, a lamp bead, and a lens. The lens includes a weld leg of the lens. The PCB board is provided with an insertion slot corresponding to the weld leg of the lens, and the weld leg of the lens is inserted into the insertion slot. The lamp bead is arranged on the PCB board, and the lens covers the lamp bead and is bonded to the PCB board. The reflector is partially overlapped with the PCB board. The lamp bead and the lens are located in the special-shaped assembly hole, and the first arc-shaped side and the second arc-shaped side are clamped with the lens. The weld leg of the lens corresponds to the first included angle and the second included angle.

Optionally, the lens is provided with four weld legs of the lens, and the four weld legs of lens respectively have a one-to-one correspondence with two sides of the first included angle and two sides of the second included angle.

Optionally, the first upper side, the second upper side, the first connection side, the second connection side, the first lower side, the second lower side, the third connection side, and the fourth connection side are laminated with the PCB board.

According to another aspect of one of embodiments of the present disclosure, a reflector is provided. A special-shaped assembly hole penetrates the reflector. The special-shaped assembly hole includes a first included angle and a second included angle opposite to each other. Two sides forming the first included angle are respectively a first upper side and a second upper side, and two sides forming the second included angle are respectively a first lower side and a second lower side. The special-shaped assembly hole further includes a first limiting side, a second limiting side, a third limiting side, and a fourth limiting side. The first limiting side is parallel to the first upper side, and a vertical distance from the first limiting side to a center is less than that from the first upper side to the center. The second limiting side is parallel to the first lower side, and a vertical distance from the second limiting side to the center is less than that from the first lower side to the center. The third limiting side is parallel to the second upper side, and a vertical distance from the third limiting side to the center is less than that from the second upper side to the center. The fourth limiting side is parallel to the second lower side, and a vertical distance from the fourth limiting side to the center is less than that from the second lower side to the center.

Optionally, the special-shaped assembly hole is of axisymmetric shape, the special-shaped assembly hole is symmetrical along a horizontal axis passing through the center, and is symmetrical along a vertical axis passing through the center. The center is a center of the special-shaped assembly hole, and the horizontal axis and the vertical axis are perpendicular to each other in a plane where the reflector is located.

Optionally, a vertex of the first included angle and a vertex of the second included angle are on the vertical axis.

Optionally, the special-shaped assembly hole further includes a first arc-shaped side and a second arc-shaped side opposite to each other. The first arc-shaped side and the second arc-shaped side are symmetrical along the horizontal axis passing through the center, and are symmetrical along the vertical axis passing through the center. The first arc-shaped side and the second arc-shaped side protrude toward the center. The first limiting side is connected to an end of the first arc-shaped side close to the first included angle. The second limiting side is connected to an end of the first arc-shaped side close to the second included angle. The third limiting side is connected to an end of the second arc-shaped side close to the first included angle. The fourth limiting side is connected to an end of the second arc-shaped side close to the second included angle.

Optionally, the special-shaped assembly hole further includes a first connection side, a second connection side, a third connection side, and a fourth connection side. The first limiting side is connected to the first upper side through the first connection side. The second limiting side is connected to the first lower side through the second connection side. The third limiting side is connected to the second upper side through the third connection side. The fourth limiting side is connected to the second lower side through the fourth connection side.

Optionally, the special-shaped assembly hole is in a shape of an irregular rhombus.

In at least a part of embodiments of the present disclosure, through arranging gaps of the first upper side, the second upper side, the first lower side, and the second lower side in a direction away from the center relative to the first limiting side, the second limiting side, the third limiting side, and the fourth limiting side, when the PCB board and the reflector are misaligned, there can be still a space between the weld leg of the lens and the side edge of the special-shaped assembly hole. When the reflector expands, the weld leg of the lens will not be easily cut, thereby reducing the probability of the lens falling off from the PCB board, and improving the fault tolerance effect of the special-shaped assembly hole, which solves the technical problem that the fault tolerance effect of the special-shaped assembly hole of the conventional reflector is not good, and the lens easily falls off from the PCB board.

BRIEF DESCRIPTION OF THE DRAWINGS

FIG. 6 is a schematic diagram of a structure of misalignment during assembly of a reflector of an embodiment of the present disclosure and the PCB board.

The realization of the purpose, functional characteristics and advantages of the present disclosure will be further described with reference to the accompanying drawings in conjunction with the embodiments.

DETAILED DESCRIPTION

It should be understood that the specific embodiments described herein are only used to explain the present disclosure, and are not intended to limit the present disclosure.

Figure 1:
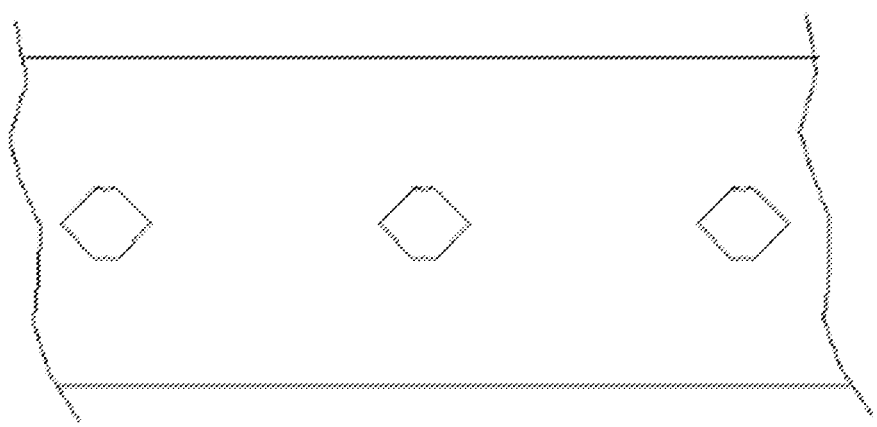
FIG. 1 is a schematic diagram of a structure of a reflector of an embodiment of the present disclosure.
Figure 2:
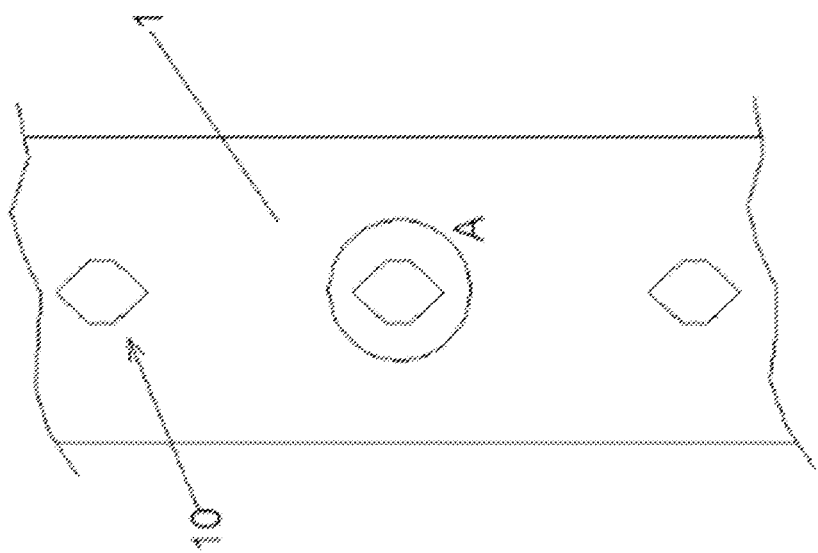
FIG. 2 is another schematic diagram of a structure of a reflector of an embodiment of the present disclosure.
Figure 3:
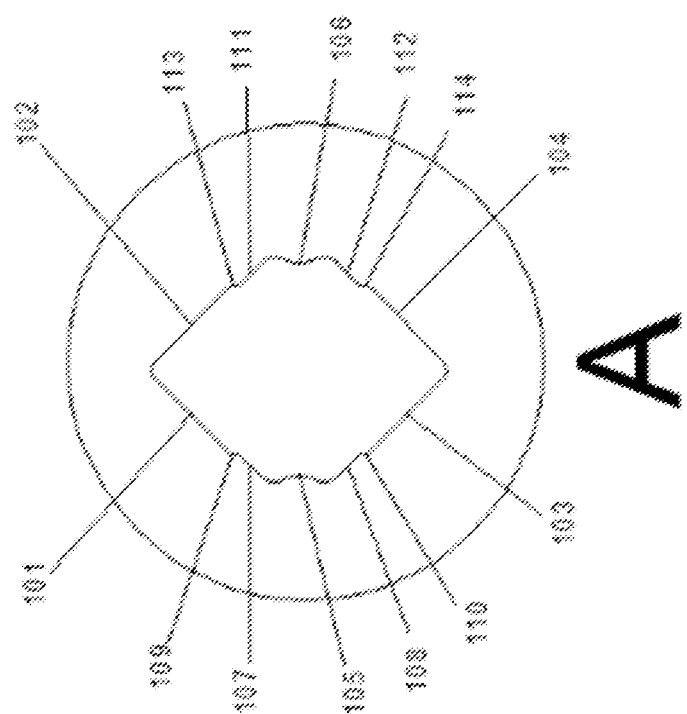
FIG. 3 is a schematic diagram of an enlarged structure of Circle A in FIG. 2.
Figure 4:
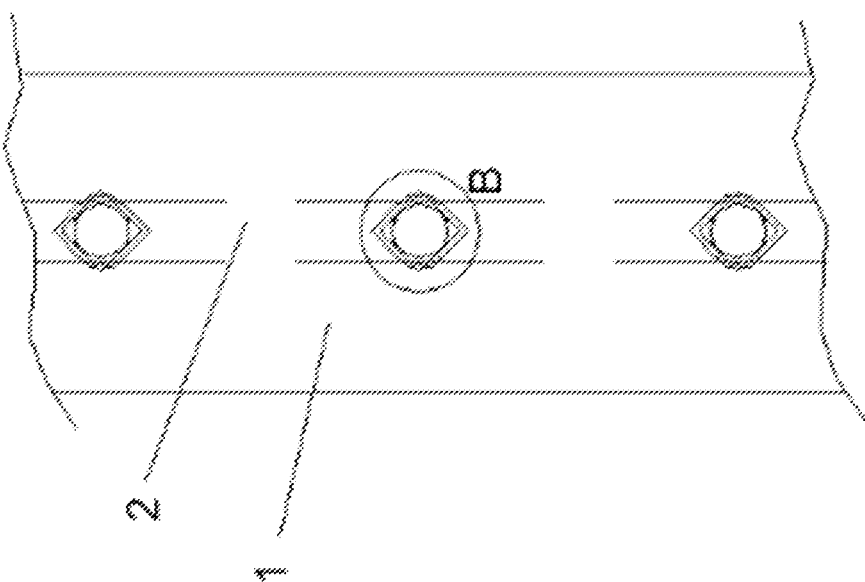
FIG. 4 is a schematic diagram of an assembly structure of a reflector of an embodiment of the present disclosure and a PCB board and a lens.
Figure 5:
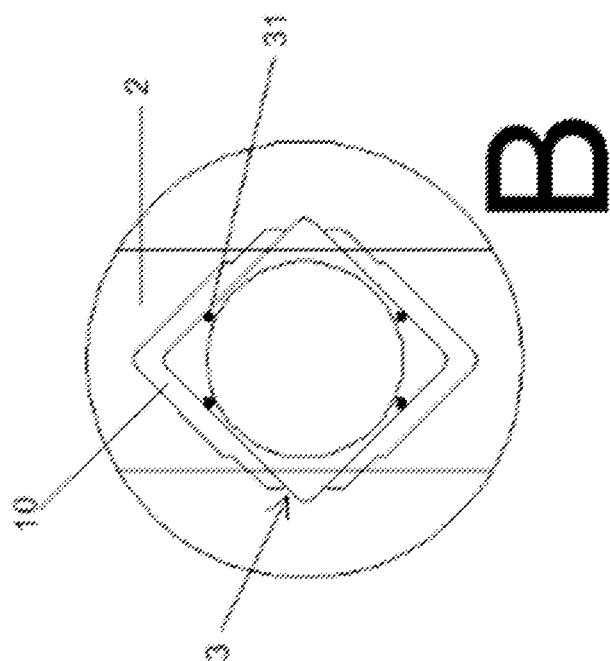
FIG. 5 is a schematic diagram of an enlarged structure of Circle B in FIG. 4.

Referring to FIGS. 1-6, the present disclosure provides a reflector 1. The reflector 1 is provided with a special-shaped assembly hole 10, and the special-shaped assembly hole 10 penetrates the reflector 1. The special-shaped assembly hole 10 is of an axisymmetric shape. The special-shaped assembly hole 10 is symmetrical along a horizontal axis passing through a center. The special-shaped assembly hole 10 is symmetrical along a vertical axis passing through the center. The center is a center of the special-shaped assembly hole 10, and the horizontal axis and the vertical axis are perpendicular to each other in a plane where the reflector 1 is located. The special-shaped assembly hole 10 is in a shape of an irregular rhombus. The special-shaped assembly hole 10 includes a first included angle and a second included angle opposite to each other, and a vertex of the first included angle and a vertex of the second included angle are on the vertical axis. Two sides forming the first included angle are respectively a first upper side 101 and a second upper side 102, and two sides forming the second included angle are respectively a first lower side 103 and a second lower side 104. The special-shaped assembly hole 10 further includes a first arc-shaped side 105 and a second arc-shaped side 106 opposite to each other. The first arc-shaped side 105 and the second arc-shaped side 106 are symmetrical along the horizontal axis passing through the center, and are symmetrical along the vertical axis passing through the center. The first arc-shaped side 105 and the second arc-shaped side 106 protrude toward the center. The special-shaped assembly hole 10 further includes a first limiting side 107, a second limiting side 108, a first connection side 109, and a second connection side 110. The first limiting side 107 is connected to an end of the first arc-shaped side 105 close to the first included angle, and the first limiting side 107 is connected to the first upper side 101 through the first connection side 109. The second limiting side 108 is connected to an end of the first arc-shaped side 105 close to the second included angle, and the second limiting side 108 is connected to the first lower side 103 through the second connection side 110. The first limiting side 107 is parallel to the first upper side 101, and a vertical distance from the first limiting side 107 to the center is less than that from the first upper side 101 to the center. The second limiting side 108 is parallel to the first lower side 103, and a vertical distance from the second limiting side 108 to the center is less than that from the first lower side 103 to the center. The special-shaped assembly hole 10 further includes a third limiting side 111, a fourth limiting side 112, a third connection side 113, and a fourth connection side 114. The third limiting side 111 is connected to an end of the second arc-shaped side 106 close to the first included angle, and the third limiting side 111 is connected to the second upper side 102 through the third connection side 113. The fourth limiting side 112 is connected to an end of the second arc-shaped side 106 close to the second included angle, and the fourth limiting side 112 is connected to the second lower side 104 through the fourth connection side 114. The third limiting side 111 is parallel to the second upper side 102, and a vertical distance from the third limiting side 111 to the center is less than that from the second upper side 102 to the center. The fourth limiting side 112 is parallel to the second lower side 104, and a vertical distance from the fourth limiting side 112 to the center is less than that from the second lower side 104 to the center.

Optionally, through arranging gaps of the first upper side 101, the second upper side 102, the first lower side 103, and the second lower side 104 in a direction away from the center relative to the first limiting side 107, the second limiting side 108, the third limiting side 111, and the fourth limiting side 112, when the PCB board and the reflector are misaligned, there can be still a space between the weld leg of the lens 31 and the side edge of the special-shaped assembly hole 10. When the reflector 1 expands, the weld leg of the lens 31 will not be easily cut, thereby reducing the probability of the lens 3 falling off from the PCB board, and improving the fault tolerance effect of the special-shaped assembly hole 10, which solves the technical problem that the fault tolerance effect of the special-shaped assembly hole 10 of the conventional reflector 1 is not good, and the lens 3 easily falls off from the PCB board.

Thereinto, the vertical axis is along a vertical direction of the PCB board, and the horizontal axis is a horizontal direction of the PCB board. The lens 3 includes a cylindrical part and a rectangular sheet part arranged at the bottom end of the cylindrical part, and the cylindrical part is arranged in the middle of the rectangular sheet part. The weld leg of the lens 31 is arranged on a side of the rectangular sheet part facing away from the cylindrical part. When connecting, the two corners of the rectangular sheet part are in the vertical direction and the other two corners are in the horizontal direction. The design that the first arc-shaped side 105 and the second arc-shaped side 106 protrude inwards makes them easier to be deformed by force, which can make it easier for the reflector to realize being clamped with the lens 3 in the horizontal direction.

Optionally, in some embodiments, a gap between the first limiting side 107 and the first upper side 101 is greater than or equal to 2 mm. A gap between the second limiting side 108 and the first lower side 103 is greater than or equal to 2 mm. A gap between the third limiting side 111 and the second upper side 102 is greater than or equal to 2 mm. A gap between the fourth limiting side 112 and the second lower side 104 is greater than or equal to 2 mm. The base material of the reflector 1 is PET, and under a high-temperature and high-humidity environment, an expansion rate of the reflector 1 can reach 0.2%. The current reflector 1 with a common size has a cutting distance of less than 2 mm after thermal expansion. When the gap is greater than or equal to 2 mm, it is possible to effectively prevent the reflector 1 from expanding and cutting the weld leg of the lens 31, so as to improve the fault tolerance effect of the special-shaped assembly hole 10.

Optionally, in some embodiments, a length of the first limiting side 107 is less than or equal to that of the first upper side 101. A length of the second limiting side 108 is less than or equal to that of the first lower side 103. A length of the third limiting side 111 is less than or equal to that of the second upper side 102. A length of the fourth limiting side 112 is less than or equal to that of the second lower side 104. The larger the proportion of the first upper side 101, the first lower side 103, the second upper side 102, and the second lower side 104 relative to the corresponding first limiting side 107, the second limiting side 108, the third limiting side 111, and the fourth limiting side 112 is, the higher the probability of matching the weld leg of the lens 31 is, thereby improving the fault tolerance effect of the special-shaped assembly hole 10.

Optionally, in some embodiments, a length of the first limiting side 107 is ½ of a length of the first upper side 101. A length of the second limiting side 108 is ½ of a length of the first lower side 103. A length of the third limiting side 111 is ½ of a length of the second upper side 102. A length of the fourth limiting side 112 is ½ of a length of the second lower side 104.

The present disclosure further provides a backlight, comprising a light bar and the above-mentioned reflector 1. The light bar includes a PCB board 2, a lamp bead, and a lens 3. The lens 3 includes a weld leg of the lens 31. The PCB board 2 is provided with an insertion slot corresponding to the weld leg of the lens 31, and the weld leg of the lens 31 is inserted into the insertion slot. The lamp bead is arranged on the PCB board 2, and the lens 3 covers the lamp bead and is bonded to the PCB board 2. The reflector 1 is partially overlapped with the PCB board 2. The lamp bead and the lens 3 are located in the special-shaped assembly hole 10, and the first arc-shaped side 105 and the second arc-shaped side 106 are clamped with the lens 3. The weld leg of the lens 31 corresponds to the first included angle and the second included angle.

Through arranging gaps of the first upper side 101, the second upper side 102, the first lower side 103, and the second lower side 104 in a direction away from the center relative to the first limiting side 107, the second limiting side 108, the third limiting side 111, and the fourth limiting side 112, when the PCB board 2 and the reflector are misaligned, there can be still a space between the weld leg of the lens 31 and the side edge of the special-shaped assembly hole 10. When the reflector 1 expands, the weld leg of the lens 31 will not be easily cut, thereby reducing the probability of the lens 3 falling off from the PCB board 2, and improving the fault tolerance effect of the special-shaped assembly hole 10, which solves the technical problem that the fault tolerance effect of the special-shaped assembly hole 10 of the conventional reflector 1 is not good, and the lens 3 easily falls off from the PCB board 2.

Optionally, the lens 3 is provided with four of the weld legs of the lens 31, and the four weld legs of the lens 31 respectively have a one-to-one correspondence with the two sides of the first included angle and the two sides of the second included angle. That is, the four weld legs of the lens 31 correspond to the first upper side 101, the second upper side 102, the first lower side 103, and the second lower side 104, respectively. When the reflector 1 expands, the weld legs of the lens 31 will not be easily cut, thereby reducing the probability of the lens 3 falling off from the PCB board 2 and improving the fault tolerance effect of the special-shaped assembly hole 10.

Optionally, the first upper side 101, the second upper side 102, the first connection side 109, the second connection side 110, the first lower side 103, the second lower side 104, the third connection side 113, and the fourth connection side 114 are laminated with the PCB board 2. This manner of opening holes ensures that an area of a hollowed-out part of the backplane does not increase, and an area of hollowed-out in the PCB board 2 of the light bar is increased. Thus, while improving the fault tolerance effect of the special-shaped assembly holes 10, a light effect will not be affected due to coating a surface of the PCB with white ink.

The beneficial effect of the present disclosure is that through arranging gaps of the first upper side 101, the second upper side 102, the first lower side 103, and the second lower side 104 in a direction away from the center relative to the first limiting side 107, the second limiting side 108, the third limiting side 111, and the fourth limiting side 112, when the PCB board 2 and the reflector are misaligned, there can still be a space between the weld leg of the lens 31 and the side edge of the special-shaped assembly hole 10. When the reflector 1 expands, the weld leg of the lens 31 will not be easily cut, thereby reducing the probability of the lens 3 falling off from the PCB board 2, and improving the fault tolerance effect of the special-shaped assembly hole 10, which solves the technical problem that the fault tolerance effect of the special-shaped assembly hole 10 of the conventional reflector 1 is not good, and the lens 3 easily falls off from the PCB board 2.

The above are only the preferred embodiments of the present disclosure, and are not intended to limit the claimed scope of the present disclosure. Any equivalent structure or equivalent process transformation made by using the contents of the description and drawings of the present disclosure, or directly or indirectly applied to other related technical fields are similarly included within the claimed scope of patent protection of the present disclosure.

As mentioned above, the reflector and the backlight having the same provided by at least a part of embodiments of the present disclosure has the beneficial effect as follows: through arranging gaps of the first upper side, the second upper side, the first lower side and the second lower side relative to the first limiting side, the second limiting side, the third limiting side and the fourth limiting side in a direction away from the center, when the PCB board and the reflector are misaligned, there can be still a space between the weld leg of the lens and the side edge of the special-shaped assembly hole. When the reflector expands, the weld leg of the lens will not be easily cut, thereby reducing the probability of the lens falling off from the PCB board, and improving the fault tolerance effect of the special-shaped assembly hole, which solves the technical problem that the fault tolerance effect of the special-shaped assembly hole of the conventional reflector is not good, and the lens easily falls off from the PCB board.

What is claimed is:

1. A reflector, comprising:
   a special-shaped assembly hole that penetrates the reflector,
   wherein the special-shaped assembly hole is of an axisymmetric shape, the special-shaped assembly hole is symmetrical along a horizontal axis passing through a center and is symmetrical along a vertical axis passing through the center, the center is a center of the special-shaped assembly hole, and the horizontal axis and the vertical axis are perpendicular to each other in a plane where the reflector is located;
   wherein the special-shaped assembly hole is in a shape of an irregular rhombus;
   wherein the special-shaped assembly hole comprises a first included angle and a second included angle opposite to each other, a vertex of the first included angle and a vertex of the second included angle are on the vertical axis, two sides forming the first included angle are respectively a first upper side and a second upper side, and two sides forming the second included angle are respectively a first lower side and a second lower side;
   wherein the special-shaped assembly hole further comprises a first arc-shaped side and a second arc-shaped side opposite to each other, the first arc-shaped side and the second arc-shaped side are symmetrical along the horizontal axis passing through the center and are symmetrical along the vertical axis passing through the center, and the first arc-shaped side and the second arc-shaped side protrude toward the center;
   wherein the special-shaped assembly hole further comprises a first limiting side, a second limiting side, a first connection side, and a second connection side;
   wherein the first limiting side is connected to an end of the first arc-shaped side close to the first included angle and is connected to the first upper side through the first connection side;
   wherein the second limiting side is connected to an end of the first arc-shaped side close to the second included angle and is connected to the first lower side through the second connection side;

wherein the first limiting side is parallel to the first upper side, and a vertical distance from the first limiting side to the center is less than a vertical distance from the first upper side to the center;

wherein the second limiting side is parallel to the first lower side, and a vertical distance from the second limiting side to the center is less than a vertical distance from the first lower side to the center;

wherein the special-shaped assembly hole further comprises a third limiting side, a fourth limiting side, a third connection side, and a fourth connection side;

wherein the third limiting side is connected to an end of the second arc-shaped side close to the first included angle and is connected to the second upper side through the third connection side;

wherein the fourth limiting side is connected to an end of the second arc-shaped side close to the second included angle and is connected to the second lower side through the fourth connection side;

wherein the third limiting side is parallel to the second upper side, and a vertical distance from the third limiting side to the center is less than a vertical distance from the second upper side to the center; and wherein the fourth limiting side is parallel to the second lower side, and a vertical distance from the fourth limiting side to the center is less than a vertical distance from the second lower side to the center.

2. The reflector according to claim 1, wherein a gap between the first limiting side and the first upper side is greater than or equal to 2 mm, wherein a gap between the second limiting side and the first lower side is greater than or equal to 2 mm, wherein a gap between the third limiting side and the second upper side is greater than or equal to 2 mm, and wherein a gap between the fourth limiting side and the second lower side is greater than or equal to 2 mm.

3. The reflector according to claim 1, wherein a length of the first limiting side is less than or equal to a length of the first upper side, wherein a length of the second limiting side is less than or equal to a length of the first lower side, wherein a length of the third limiting side is less than or equal to a length of the second upper side, and wherein a length of the fourth limiting side is less than or equal to a length of the second lower side.

4. The reflector according to claim 1, wherein a length of the first limiting side is ½ of a length of the first upper side, wherein a length of the second limiting side is ½ of a length of the first lower side, wherein a length of the third limiting side is ½ of a length of the second upper side, and wherein a length of the fourth limiting side is ½ of a length of the second lower side.

5. A backlight, comprising a light bar and the reflector according to claim 1, wherein the light bar comprises a PCB board, a lamp bead, and a lens, wherein the lens comprises a weld leg of the lens, the PCB board is provided with an insertion slot corresponding to the weld leg of the lens, and the weld leg of the lens is inserted into the insertion slot, wherein the lamp bead is arranged on the PCB board and the lens covers the lamp bead and is bonded to the PCB board, and the reflector is partially overlapped with the PCB board, wherein the lamp bead and the lens are located in the special-shaped assembly hole, and the first arc-shaped side and the second arc-shaped side are clamped with the lens, and wherein the weld leg of the lens corresponds to the first included angle and the second included angle.

6. The backlight according to claim 5, wherein the lens is provided with four of the weld legs of the lens, and wherein the four weld legs of the lens respectively have a one-to-one correspondence with the two sides of the first included angle and the two sides of the second included angle.

7. The backlight according to claim 5, wherein the first upper side, the second upper side, the first connection side, the second connection side, the first lower side, the second lower side, the third connection side, and the fourth connection side are laminated with the PCB board.

8. A reflector, comprising:

a special-shaped assembly hole that penetrates the reflector, wherein the special-shaped assembly hole comprises a first included angle and a second included angle opposite to each other, two sides forming the first included angle are respectively a first upper side and a second upper side, and two sides forming the second included angle are respectively a first lower side and a second lower side;

wherein the special-shaped assembly hole further comprises a first limiting side, a second limiting side, a third limiting side, and a fourth limiting side;

wherein the first limiting side is parallel to the first upper side, and a vertical distance from the first limiting side to a center is less than a vertical distance from the first upper side to the center;

wherein the second limiting side is parallel to the first lower side, and a vertical distance from the second limiting side to the center is less than a vertical distance from the first lower side to the center;

wherein the third limiting side is parallel to the second upper side, and a vertical distance from the third limiting side to the center is less than a vertical distance from the second upper side to the center; and wherein the fourth limiting side is parallel to the second lower side, and a vertical distance from the fourth limiting side to the center is less than a vertical distance from the second lower side to the center.

9. The reflector according to claim 8, wherein the special-shaped assembly hole is of axisymmetric shape, the special-shaped assembly hole is symmetrical along a horizontal axis passing through the center, and is symmetrical along a vertical axis passing through the center, wherein the center is a center of the special-shaped assembly hole, and wherein the horizontal axis and the vertical axis are perpendicular to each other in a plane where the reflector is located.

10. The reflector according to claim 9, wherein a vertex of the first included angle and a vertex of the second included angle are on the vertical axis.

11. The reflector according to claim 9, wherein the special-shaped assembly hole further comprises a first arc-shaped side and a second arc-shaped side opposite to each other, the first arc-shaped side and the second arc-shaped side are symmetrical along the horizontal axis passing through the center, and are symmetrical along the vertical axis passing through the center, and the first arc-shaped side and the second arc-shaped side protrude toward the center, wherein the first limiting side is connected to an end of the first arc-shaped side close to the first included angle, wherein the second limiting side is connected to an end of the first arc-shaped side close to the second included angle, wherein the third limiting side is connected to an end of the second arc-shaped side close to the first included angle, and wherein the fourth limiting side is connected to an end of the second arc-shaped side close to the second included angle.

12. The reflector according to claim 8, wherein the special-shaped assembly hole further comprises a first connection side, a second connection side, a third connection side, and a fourth connection side, wherein the first limiting side is connected to the first upper side through the first connection side, wherein the second limiting side is connected to the first lower side through the second connection side, wherein the third limiting side is connected to the second upper side through the third connection side, and wherein the fourth limiting side is connected to the second lower side through the fourth connection side.

13. The reflector according to claim 8, wherein the special-shaped assembly hole is in a shape of an irregular rhombus.

* * * * *